(12) United States Patent
Lee et al.

(10) Patent No.: US 12,025,708 B2
(45) Date of Patent: Jul. 2, 2024

(54) METHOD AND SYSTEM OF GENERATING 3D MAP

(71) Applicant: NAVER LABS Corporation, Seongnam-si (KR)

(72) Inventors: Yong Han Lee, Seongnam-si (KR); Su Yong Yeon, Seongnam-si (KR); Soo Hyun Ryu, Seongnam-si (KR); Deok Hwa Kim, Seongnam-si (KR); Dong Hwan Lee, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 170 days.

(21) Appl. No.: 17/684,763

(22) Filed: Mar. 2, 2022

(65) Prior Publication Data

US 2022/0283310 A1 Sep. 8, 2022

(30) Foreign Application Priority Data

Mar. 2, 2021 (KR) ........................ 10-2021-0027774

(51) Int. Cl.
| | |
|---|---|
| *G06T 7/73* | (2017.01) |
| *G01S 17/87* | (2020.01) |
| *G01S 17/894* | (2020.01) |
| *G06T 7/20* | (2017.01) |
| *G06T 7/50* | (2017.01) |
| *G06T 17/05* | (2011.01) |

(52) U.S. Cl.
CPC ............ *G01S 17/894* (2020.01); *G01S 17/87* (2013.01); *G06T 7/20* (2013.01); *G06T 7/50* (2017.01); *G06T 7/74* (2017.01); *G06T 17/05* (2013.01); *G06T 2207/10028* (2013.01); *G06T 2207/30241* (2013.01)

(58) Field of Classification Search
CPC ......... G01S 17/87; G01S 17/894; G06T 7/20; G06T 7/50; G06T 7/73; G06T 7/74; G06T 17/05; G06T 2207/10028; G06T 2207/30241
See application file for complete search history.

(56) References Cited

FOREIGN PATENT DOCUMENTS

| | | | |
|---|---|---|---|
| JP | 2009237845 A | * | 10/2009 |
| JP | 2009237845 A | | 10/2009 |

(Continued)

OTHER PUBLICATIONS

Alismail, Hatem, L. Douglas Baker, and Brett Browning. "Continuous trajectory estimation for 3D SLAM from actuated lidar." 2014 IEEE International Conference on Robotics and Automation (ICRA). IEEE, 2014. (Year: 2014).*

(Continued)

*Primary Examiner* — Diane M Wills
(74) *Attorney, Agent, or Firm* — GREER BURNS & CRAIN, LTD.

(57) ABSTRACT

The present invention relates to a method and system of generating a three-dimensional (3D) map. The 3D map generating method of the present invention includes: collecting spatial data and image data on a specific space by using a lidar sensor and a camera sensor that are each provided on a collecting device; estimating a movement trajectory of the lidar sensor by using the spatial data; and generating 3D structure data on the specific space based on structure-from-motion (SFM), by using the image data and the movement trajectory as input data.

14 Claims, 11 Drawing Sheets

(56) References Cited

FOREIGN PATENT DOCUMENTS

| KR | 20190070514 A | * | 6/2019 |
| KR | 1020210015516 A | | 2/2021 |
| WO | 2018131165 A1 | | 7/2018 |
| WO | 2021006677 A2 | | 1/2021 |

OTHER PUBLICATIONS

Anderson, Sean, Frank Dellaert, and Timothy D. Barfoot. "A hierarchical wavelet decomposition for continuous-time SLAM." 2014 IEEE International Conference on Robotics and Automation (ICRA). IEEE, 2014. (Year: 2014).*

Blaser S, Nebiker S, Wisler D. Portable Image-based High Performance Mobile Mapping System in Underground Environments—System Configuration and Performance Evaluation. ISPRS Annals of the Photogrammetry, Remote Sensing and Spatial Information Sciences. May 29, 2019;4:255-62. (Year: 2019).*

Lee et al., "Large-scale Localization Datasets in Crowded Indoor Spaces", Proceedings of the IEEE/CVF Conference on Computer Vision and Pattern Recognition (CVPR), Jun. 2021, pp. 3227-3236.

Han et al., "3D Reconstruction of Structure Fusion-Based on UAS and Terrestrial LiDAR", Journal of Urban Science, vol. 7, Issue 2, Dec. 30, 2018, pp. 53-60, doi: 10.22645/UDI.2018.12.30.053.

Notice of Allowance issued by the JPO on Mar. 28, 2023 for the corresponding JP patent application No. 2022-30728.

Office Action issued by the KIPO on May 17, 2023 for the corresponding KR patent application No. 10-2021-0027774.

* cited by examiner

METHOD AND SYSTEM OF GENERATING 3D MAP

CROSS-REFERENCE TO RELATED APPLICATION

Pursuant to 35 U.S.C. § 119(a), this application claims the benefit of the earlier filing date and the right of priority to Korean Patent Application No. 10-2021-0027774, filed on Mar. 2, 2021, the contents of which are hereby incorporated by reference herein in their entirety.

BACKGROUND

1. Technical Field

The present invention relates to a method and a system of generating a three-dimensional (3D) map, and more particularly, to a method and system of generating a 3D map which can be utilized for location determination in a specific space.

2. Description of the Related Art

Location determination technologies have been developed as various types of systems such as Global Positioning System (GPS), inertial sensor-based localization, visual localization, Simultaneous Localization And Mapping (SLAM), and Visible Light Communication (VLC) are related to each other.

Among such location determination technologies, visual localization is a technology to search for a position through captured pictures. When compared with GPS, visual localization has advantages such as errors are smaller, and the direction that a user faces can be more precisely measured. For visual localization, a map for specifying a position through a comparison with captured pictures should be established.

Here, different factors should be considered, such as whether such a map is established for an indoor space or an outdoor environment. For instance, an indoor space may have a significant change of viewpoint resulting from even a small motion of a camera because such indoor space is generally smaller than the outdoor environment. Also, in a substantial environment of a large-scale indoor space, such as a large-sized shopping mall or a subway, the degree of congestion changes according to the time of day, and it is difficult to precisely estimate a camera pose due to areas of the space having no texture, etc.

Due to such problems, it is difficult to apply Structure-From-Motion (SFM) on a large scale in an indoor space, whereas SFM can be used as an effective tool in the outdoor environment. In the indoor space, a common method is to establish a map by using an RGB-D camera, a laser scanner, etc. However, this is most suitable for an indoor space which is relatively small. Since the RGB-D camera has a short distance of measurement, and the laser scanner is weak when color information is absent and there are many moving objects, these methods and devices are not frequently used in a large-scale indoor space.

Thus, in order to generate a map for visual localization in a large-scale indoor space, a method using a new type of pipeline (i.e., a conceptual model that describes what steps a graphics system needs to perform to render a 3D scene to a 2D screen) may be considered.

SUMMARY

Therefore, an aspect of the present invention is to provide a method and a system of generating a three-dimensional (3D) map for visual localization which is applicable to a large-scale indoor space.

More concretely, an aspect of the present invention is to provide a method and a system of generating a 3D feature map, which is applicable to visual localization, by utilizing a new type of pipeline.

Another aspect of the present invention is to provide a method and system of generating a more precise map for a large-scale indoor space, by using data obtained with time intervals for a predetermined period.

In the method and the system of generating a 3D map according to the present invention, a 3D map is established by performing visual mapping utilizing lidar (also referred to as LiDAR) sensor trajectory based on sequence data collected for a predetermined period with respect to a large-scale specific space. For instance, in the present invention, a process of generating a 3D map for a specific space, through a pipeline from Lidar Simultaneous Localization and Mapping (SLAM) to Structure-From-Motion (SFM) is sued.

More specifically, the 3D map generating method of the present invention includes: collecting spatial data and image data on a specific space by using a lidar sensor and a camera sensor each provided at a collecting device; estimating a movement trajectory of the lidar sensor by using the spatial data; and generating 3D structure data on the specific space based on Structure-From-Motion (SFM) techniques (or simply "SFM"), by using the image data and the movement trajectory as input data.

In an embodiment of the present invention, in the collecting, the spatial data and the image data may be collected through a lidar Simultaneous Localization and Mapping (SLAM) algorithm (or simply "lidar SLAM") using the lidar sensor.

Output data of the lidar SLAM may be provided with the image data and the movement trajectory, and the output data may be used as the input data such that the lidar SLAM and the SFM form a pipeline.

In another embodiment of the present invention, the generating of the 3D structure data includes: extracting feature points from the image data, and matching the feature points among images; converting the movement trajectory into a continuous trajectory; and calculating pose information of the image data based on the continuous trajectory.

The movement trajectory may be modeled into a continuous-time trajectory such that the pose information of the image data is matched with the continuous trajectory. The generated 3D structure data is output data of the SFM, and may be provided with images having their pose information calculated and point cloud data (i.e., a set of data points in space).

In another embodiment of the present invention, in the generating of the 3D structure data, map optimization may be performed by defining a pose error by expressing the movement trajectory as a continuous cubic spline.

In another embodiment of the present invention, the 3D map generating method may further include generating a depthmap by estimating depth information of an image by using the generated 3D structure data.

In another embodiment of the present invention, the estimated movement trajectory is calculated as a plurality of data in a single area, and the 3D map generating method may further include performing matching with respect to the plurality of data. For matching with respect to the plurality of data, a coordinate system conversion may be estimated among the movement trajectories, or a relative pose among the movement trajectories may be estimated.

Further, the present invention provides a three-dimensional (3D) map generating method, including: collecting spatial data and image data on a specific space by using a lidar sensor and a camera sensor, and estimating a movement trajectory of the lidar sensor; extracting feature points from the image data, and matching the feature points among images; and converting the movement trajectory into a continuous trajectory, optimizing the feature points and pose information of the image data based on the continuous trajectory, thereby generating a 3D feature map with respect to the specific space.

Further, the present invention provides a three-dimensional (3D) map generating system, including: a collecting device having a lidar sensor and a camera sensor; and a mapping device configured to generate a 3D feature map for a specific space, by using the collecting device, wherein the collecting device collects each of spatial data and image data on the specific space, by using the lidar sensor and the camera sensor, and wherein the mapping device estimates a movement trajectory of the lidar sensor by using the spatial data, and generates 3D structure data on the specific space based on Structure-From-Motion (SFM), by using the image data and the movement trajectory as input data.

DETAILED DESCRIPTION OF THE EMBODIMENTS

Figure 1A:
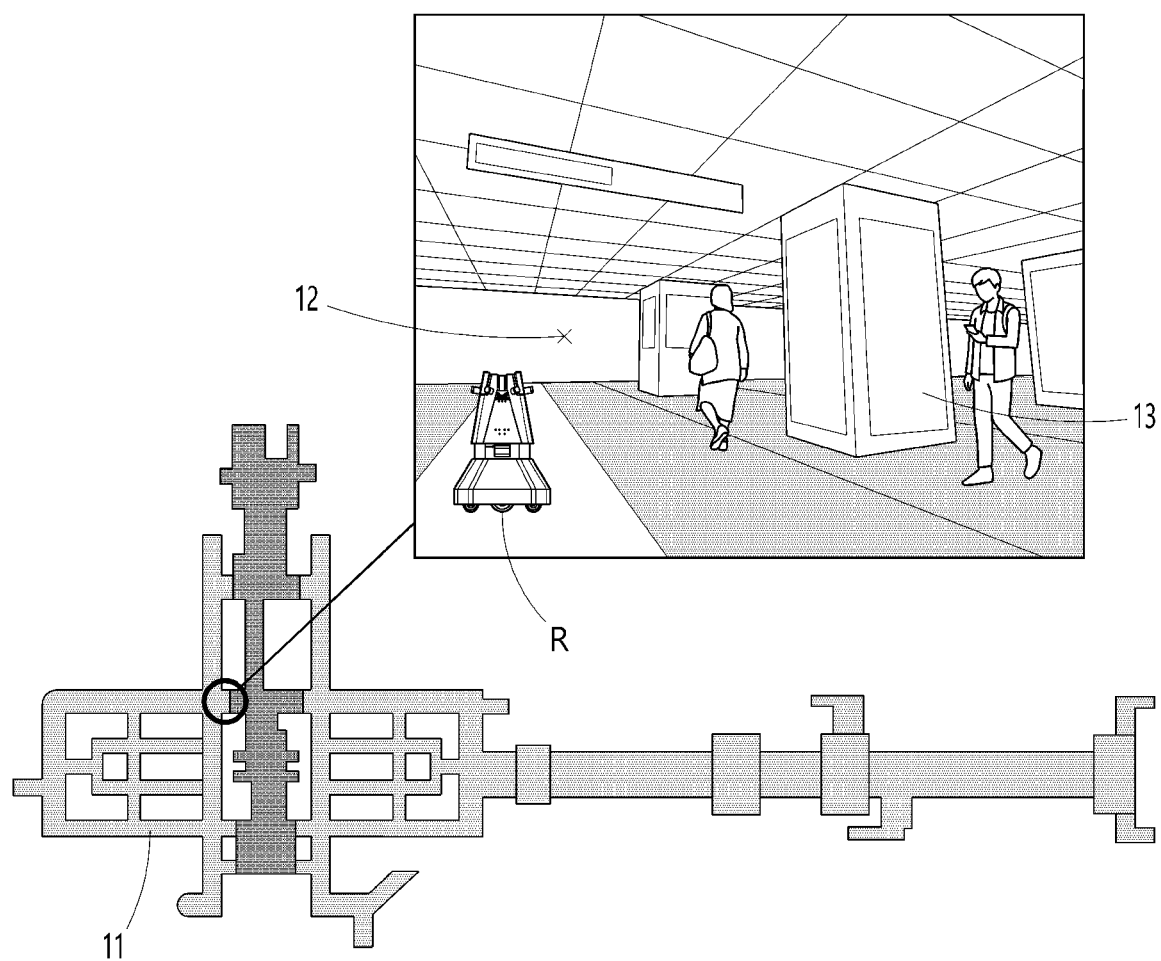
FIG. 1A is a conceptual view for explaining an operation to establish a 3D map according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

The present invention relates to a method and system of generating a 3D map, and more particularly, to a method and system of generating a 3D map which can be utilized when performing location determination at buildings, facilities, roads, sidewalks, etc.

Here, the location determination is performed to determine a location or to obtain location-related information, which may be a technology to comprehend a precise location of a mobile device by utilizing a GPS or a location of a base station of a wireless network, or by using various sensor information. Here, the precise location may be implemented as any of various types, such as an absolute location, a relative location and a conceptual location. The invention especially relates to an indoor positioning technology for obtaining a location within an indoor space where a GPS signal cannot be received.

In this specification, a mobile device is used as a term that includes all types of mobile terminals which can be held by hand or which can be carried conveniently on the body, as well as an autonomous driving device which moves autonomously.

For instance, the mobile terminal may include a portable phone, a smart phone, a notebook computer (laptop computer), a terminal for digital broadcasting, a personal digital assistant (PDA), a portable multimedia player (PMP), a navigation device, a slate PC, a tablet PC, an ultrabook, a wearable device (e.g., a watch-type terminal (smartwatch), a glass-type terminal (smart glass) and a head mounted display (HMD)), etc. As another example, the autonomous driving device may be a robot which provides location-based services while moving, such as a cleaning robot, a guiding robot and a delivery robot, or may be a drone which moves autonomously within a building, etc.

In the preferred embodiments of the present invention, a new type of location determination method and system capable of obtaining a location at a specific space, or obtaining a location while moving within a specific space will be explained based on a position of the mobile terminal or the autonomous driving device. However, the present invention is not limited to this. The mobile terminal or the autonomous driving device is understood as a means to determine a user's location, and other devices may be applicable to the present invention.

In this case, the location determination may be applied to various methods, such as to a method for detecting a zone where a mobile device is located, or to a method for detecting a real-time position of a mobile device. Also, the location measurement of the present invention may be referred to as localization, location determination, positioning, etc.

Among such indoor location determination technologies, visual localization is a technology to search for a location through captured photos, and is used to determine a location of a mobile device by estimating camera pose information of a preset query image.

In the present invention, an "image" refers to, for example, a photo or a picture captured by a camera sensor, etc. For instance, after the mobile device captures an image by the camera sensor while moving at a specific space, a position of the mobile device may be estimated in real time through a process of comparing the captured image with 3D map data.

The visual localization of the present invention provides a user with current location information, and a 3D map generated by using an image is used for providing the user with such information.

Figure 1B:
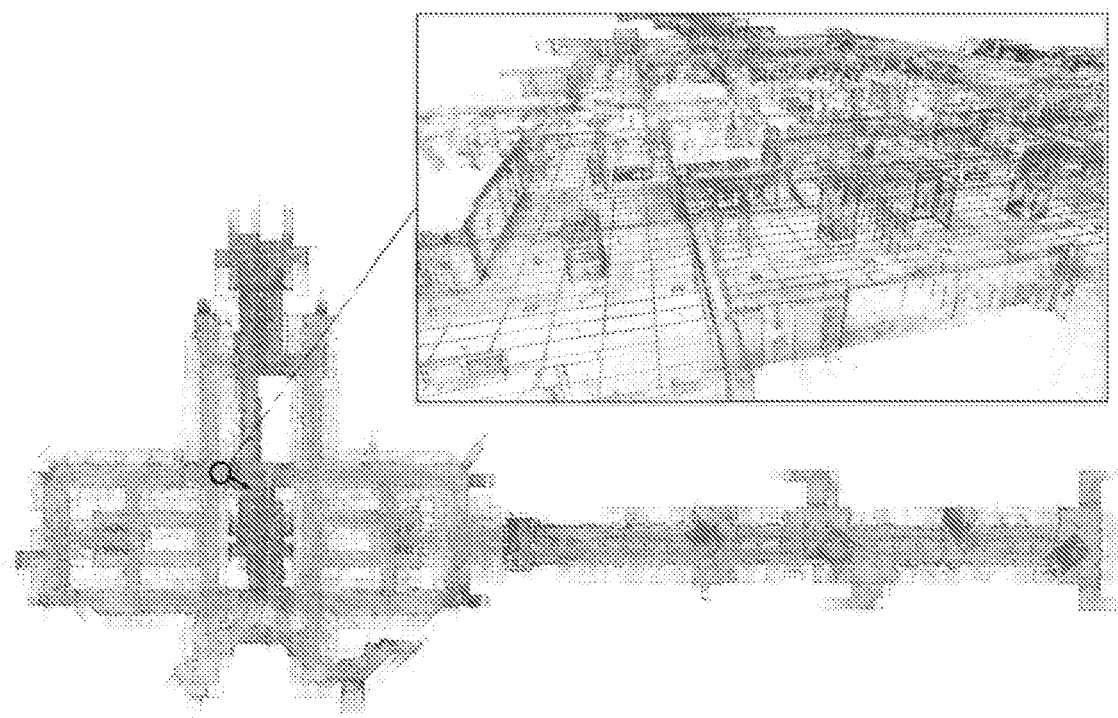
FIG. 1B shows an example of a 3D map presented from the concept of FIG. 1A.

FIG. 1A is a conceptual view for explaining an operation to establish a 3D map according to the present invention, and FIG. 1B shows an example of a 3D map presented from the concept of FIG. 1A.

Referring to FIG. 1A, a robot (R) is located within an indoor space 11, where the robot (R) is provided as a device for collecting data. The robot (R) may be a mapping robot for collecting data in order to establish 3D map data. There is no limitation on the type of a space where the robot (R) drives, and the robot may be configured to drive in at least one of an indoor space and an outdoor space according to necessity. In this embodiment, the robot (R) may be configured to autonomously drive within the large-scale indoor space 11 (where space 11 may be, for example, a large-sized shopping mall or a large-sized subway station), while collecting data by using a camera sensor in order to generate a 3D map.

However, in a substantially-sized environment such as the large-scale indoor space 11, there are great changes as time passes. Thus, it is very difficult to estimate the precise pose information of a camera sensor. For instance, at a textureless area 12 and/or a signage area 13, camera pose estimation for an image is very difficult due to the changing appearance which occurs by contents changing, etc., changes in the amount of crowdedness or occlusions according to time, dynamic environment changes, etc.

In the present invention, a 3D feature map is generated by using data collected for a long period of time, such as for more than 100 days, in order to correspond to a large-scale indoor space. For this, the present invention provides a new type of 3D map generation method.

As shown in FIG. 1B, datasets of a 3D map including images and point clouds may be established by the 3D map generating method of the present invention. The datasets may provide high-density image sampling including well-aligned 3D models and camera pose information.

In this case, the 3D map is a map having data on 3D feature points, and may be referred to as a feature map, a feature map, or a 3D feature map. In this embodiment, an indoor space is illustrated as the specific space. However, the present invention is not limited to this, but may be applied to an outdoor space, or to a combination of an indoor and an outdoor space, etc.

Hereinafter, a system for establishing datasets of the 3D map for the specific space will be first explained. Then, substantial examples of data established by the 3D map generating method will be explained in more detail with reference to the attached drawings.

Figure 2:
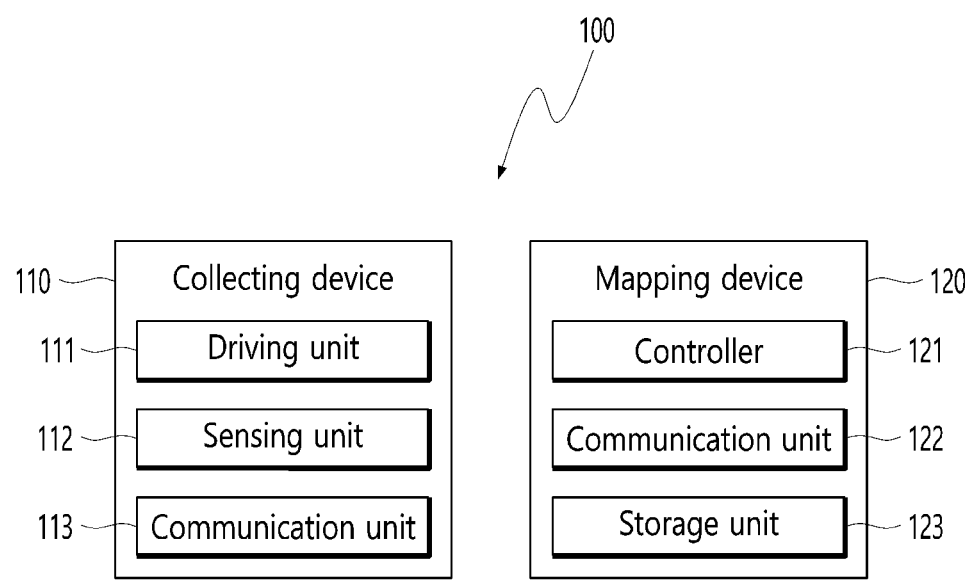
FIG. 2 is a conceptual view showing a system of generating a 3D map according to the present invention.
Figure 3:
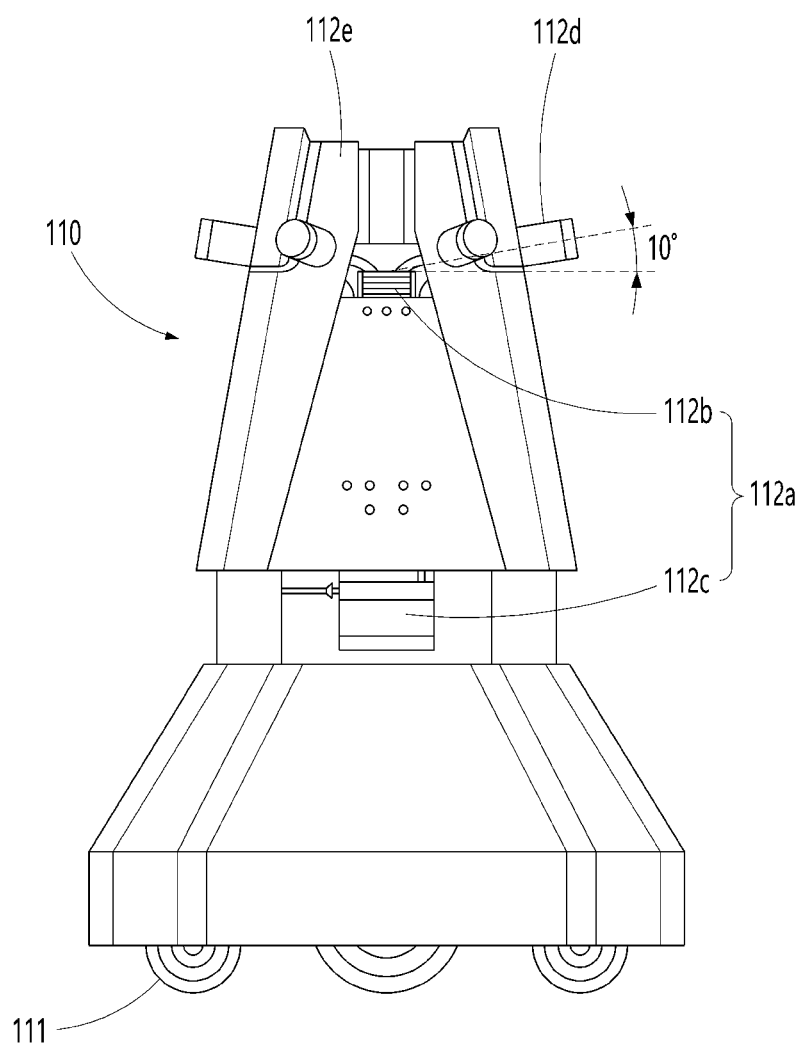
FIG. 3 is a conceptual view showing a collecting device of FIG. 2.

FIG. 2 is a conceptual view showing a system for generating a 3D map according to the present invention, and FIG. 3 is a conceptual view showing a collecting device of FIG. 2.

Datasets of the 3D map may be implemented by a 3D map generating system 100 shown in FIG. 2.

The 3D map generating system 100 may be provided with a collecting device 110 and a mapping device 120.

Here, the collecting device 110 is a data collecting device, and may be a mobile platform. The collecting device 110 may collect each of spatial data and image data on a specific space, by using a lidar sensor and a camera sensor.

As shown in FIG. 2, the collecting device 110 may be provided with at least one of a driving unit 111, a sensing unit 112 and a communication unit 113.

The driving unit 111 provides a means which allows the collecting device 100 to move within a specific space. For this, the driving unit 111 may include a motor and a plurality of wheels. For instance, as shown in FIG. 3, the driving unit 111 is configured to make the collecting device 100 drive, change direction and rotate, as the motor and the plurality of wheels thereof are combined with each other.

In the present invention, a differential drive having two wheels and four casters is illustrated as an example of the driving unit 111. Here, an encoder for obtaining data on driving distance measurement may be provided at the wheels.

The sensing unit 112 includes a lidar sensor 112a and a camera sensor 112d.

The lidar sensor 112a is a sensor for obtaining 3D information on a surrounding space by a remote sensing method, and may be a laser scanner for irradiating a laser.

The laser scanner may be a device for precisely depicting a surrounding area by irradiating laser pulses, receiving the irradiated laser pulses reflected from a surrounding object, and thereby measuring a distance to the object.

In this embodiment, as the lidar sensor, a 3D scanning lidar is illustrated to thus generate 3D spatial data. However, the present invention is not limited to this. For instance, as the lidar sensor, a 2D laser scanner or a sensor which irradiates no laser can be used.

Referring to FIG. 3, the lidar sensor 112a may be configured as a plurality of lidar sensors. A first lidar sensor 112b may be vertically arranged at an upper end of the collecting device 110, and a second lidar sensor 112c may be horizontally arranged between the upper end and lower end of the collecting device 110 (e.g., a middle region). In this case, the first lidar sensor 112b in the vertical direction forms 3D point clouds of a high-density by a push-broom scanning scheme, and the second lidar sensor 112c in the horizontal direction maximizes information required to estimate a pose within an indoor space along the horizontal direction.

The camera sensor 112d may be a camera having six degrees of freedom (DoF), and may include various types of devices. For example, the camera sensor 112d may be configured as one or more industrial camera(s) and/or as one or more smartphone camera(s). The illustrated camera sensor 112d is an industrial camera, and the device 110 may also be provided with a mounting plate 112e for mounting a smartphone camera (not shown) at the upper end of the collecting device 110.

In this embodiment, a plurality of industrial cameras are arranged along an outer circumstance of the collecting device 110 at specific intervals. With such a configuration, images may be captured from all directions (i.e., 360 ⌧ ) in the horizontal direction. In this example, each camera may be arranged to view the upper side at a specific angle in order to reduce the amount of graphics of the ground surface within the image. Meanwhile, a plurality of smartphone cameras may be arranged above the industrial camera to capture the surroundings in order to more precisely reflect a substantial environment at a query time. Here, the collecting device 110 and the sensing unit 112 may be synchronized with each other by using a Network Time Protocol (NTP) server, for instance.

The sensing unit 112 may be provided with various sensors for collecting data, in addition to the lidar sensor 112a and the camera sensor 112d. For example, the sensing unit 112 may be provided with an infrared sensor, an ultrasonic sensor, a pose sensor, a collision sensor, an optical sensor, etc., in order to recognize obstacles near the collecting device 110. As another example, the sensing unit 112 may be provided with sensors for measuring wireless signals (e.g., WiFi signals, Bluetooth signals, zigbee signals, etc.) at different positions within a specific space.

In certain embodiments, data obtained by the sensing unit 112 may be transmitted to the mapping device 120 (FIG. 2) through a communication unit 113. The communication unit 113 performs wireless communications between the collecting device 110 and the mapping device 120. In this case, the mapping device 120 may be provided with a communication unit 122 for wireless communications with the communication unit 113 of the collecting device 110. However, the present invention is not limited to wireless communications. The communication units 113, 122 may communicate with each other through wired communications. Alternatively, the communication unit 113 may perform wireless communications between the collecting device 110 and another collecting device, between the collecting device 110 and a mobile device, or between the collecting device 110 and a communication network. For such wireless communications, the communication unit 113 may be provided with a wireless internet module, a short-range communication module, a location information module, etc.

In the present invention, it is illustrated that the collecting device 110 and the mapping device 120 are separate devices. However, the collecting device 110 and the mapping device 120 may be configured as a single device. In this case, the data may be transmitted or received through an internal data transfer path.

The mapping device 120 generates a 3D feature point map (feature map) for a specific space by using the collecting device 110. In this case, the mapping device 120 may estimate a movement trajectory of the lidar sensor 112a by using the spatial data, and may generate 3D structure data on the specific space based on Structure-From-Motion (SFM), by using the image data and the movement trajectory as input data.

Meanwhile, the collecting device 110 is configured to perform SLAM when collecting data by using the sensing unit 112. That is, the collecting device 110 is configured to measure its location for the current time, and to make a map of the environment. SLAM may be performed by a processor of the collecting device 110, or by a controller 121 of the mapping device 120.

In the case that SLAM is performed by the controller 121, the mapping device 120 may be a map cloud server. In this case, the collecting device 110 and the map cloud server may constitute a single data collecting device.

Meanwhile, the controller 121 controls wireless communications, captures images by using the sensing unit 112 of the collecting device 110, and controls the driving unit 111. Additionally, the controller 121 controls overall operations of the collecting device 110.

As an example of data processing for SLAM, the controller 121 may perform simultaneous location estimation and map generation based on sensor data, and may estimate a movement path of the collecting device 110. For instance, the controller 121 may detect loop closure based on data sensed from the collecting device 110, generate location data based on the detected loop closure, and generate moving path information, and indoor map information of a target building based on the location data.

In this case, the controller 121 controls a series of processes to generate, store, and update the aforementioned datasets by interworking with a storage unit 123.

In the storage unit 123, the datasets are stored as data of a 3D map. And the 3D map may be provided with coordinate information, point cloud information, image information, pose information, etc.

For establishment of such datasets, in the 3D map generating method of the present invention, based on sequence data collected for a predetermined period with respect to a large-scale specific space, a 3D map for the specific space is generated by using a process through a pipeline from a lidar Simultaneous Localization And Mapping algorithm (hereinafter, abbreviated as 'SLAM') to Structure-From-Motion technique (hereinafter, abbreviated as 'SFM'). Hereinafter, such a 3D map generating method will be explained in more detail with reference to the attached drawings.

Figure 4:
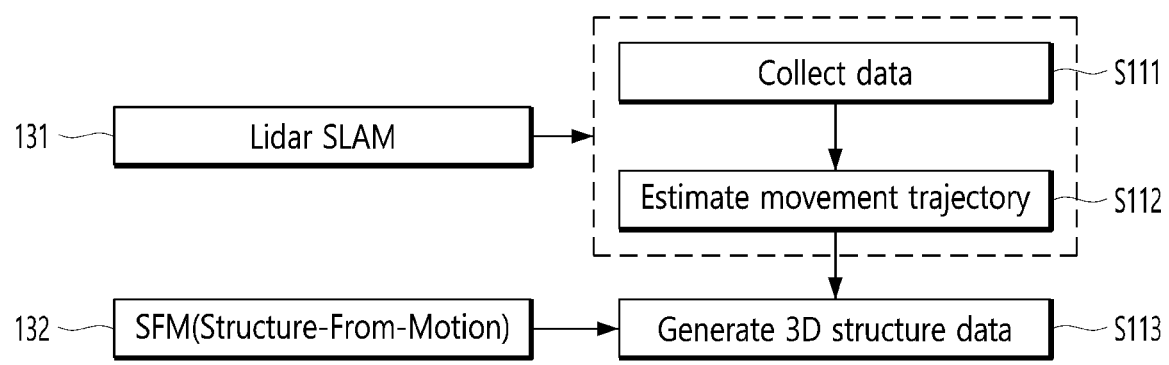
FIG. 4 is a flowchart for explaining a method of generating a 3D map according to the present invention.

FIG. 4 is a flowchart for explaining a method for generating a 3D map according to the present invention.

The 3D map generating method of the present invention proposes a new pipeline connected from lidar SLAM to SFM by using an output value of a lidar SLAM 131 as an input value of an SFM 132.

In this case, the pipeline may be provided with a lidar SLAM pipeline and an SFM pipeline. The lidar SLAM pipeline may be established based on pose-graph optimization for estimating a camera pose on the basis of an integrated coordinate system.

And the SFM pipeline refines an initial image pose (or camera pose) of the lidar SLAM 131, and reconstructs a 3D feature map aligned at lidar point clouds.

In this case, poses of substantial documents (substantial pictures, Ground Truth) for all images may be generated by the lidar SLAM 131 and the SFM 132. In the lidar SLAM 131, the controller 121 (refer to FIG. 2) generates a pose of the collecting device at each sequence, and then integrates the sequences of the same space to thus process data such that the sequences have an integrated coordinate system. The collecting device may be referred to as a platform, and will be hereinafter explained as a platform for convenience of explanation.

In this case, point clouds and camera pose information may be calculated based on a platform pose and a calibration parameter. Then, the SFM 132 may be used to refine the camera pose information. According to the aforementioned processes, camera calibration for external variables by the camera sensor can be performed without any additional manual camera calibration.

Here, the camera pose may include a coordinate indicating a position and a pose indicating an orientation. In this case, the coordinate may be specified as a coordinate obtained by adding a predetermined height (e.g., a robot's height or a person's eye height, etc.) to a coordinate of a ground surface. And the pose may be arbitrarily specified. However, in the case of using visual localization by a robot or a person, under an assumption of a situation to substantially transfer a query image, the pose may be specified as a similar pose. Using such an example, the pose may be specified on the basis of a direction horizontal to a ground surface, a direction to view a signboard, a progressing direction of a sidewalk, etc.

As a more concrete example, in the lidar SLAM pipeline of the present invention, may first perform a step (S111) of collecting spatial data and image data on a specific space by using a lidar sensor and a camera sensor provided at a platform.

Here, the lidar sensor and the camera sensor may be provided with the lidar sensor 112a and the camera sensor 112d of the platform aforementioned with reference to FIG. 3.

The spatial data may be point group data or scan data. In this case, as the point group data or the scan data is collected, the lidar SLAM may obtain other spatial data or movement trajectory by using the point group data in the next step.

Here, the spatial data may be provided with a 3D point cloud, a platform pose for each sequence, etc. Also, the image data may be a captured image that has been captured through the camera sensor.

In the collecting step (S111), the spatial data and the image data are collected through lidar SLAM using the lidar sensor.

Next, in the lidar SLAM 131, there may be performed a step (S112) of estimating a movement trajectory of the lidar sensor by using the spatial data.

For instance, a trajectory of the platform (or a trajectory of the lidar sensor or the camera sensor) may be estimated by applying a lidar-based pose graph SLAM. In this case, the lidar SLAM pose may be used as prior information of an SFM process of calculating a camera pose with respect to many trajectories within the same space.

Also, in this embodiment, any type of lidar SLAM algorithms for sequentially or simultaneously performing spatial data mapping and movement trajectory estimation by lidar may be used.

As aforementioned, the 3D map generating method of the present invention includes the step (S111) of collecting spatial data and image data on a specific space by using a lidar sensor and a camera sensor, and the step (S112) of estimating a movement trajectory of the lidar sensor.

Next, a step (S113) of generating 3D structure data on the specific space based on SFM may be performed by using the image data and the movement trajectory as input data, in order to form a new pipeline connected from the lidar SLAM 131 to the SFM 132. Mapping for a large-scale indoor space can be performed through an SFM pipeline using the image data and the movement trajectory obtained from the lidar SLAM pipeline as input data.

As aforementioned, in the present invention, a precise camera pose may be estimated despite an environment change of a large-scale indoor space by using lidar SLAM and SFM algorithms.

Hereinafter, each step of the 3D map generating method of the present invention will be explained in more detail with examples.

Figure 5:
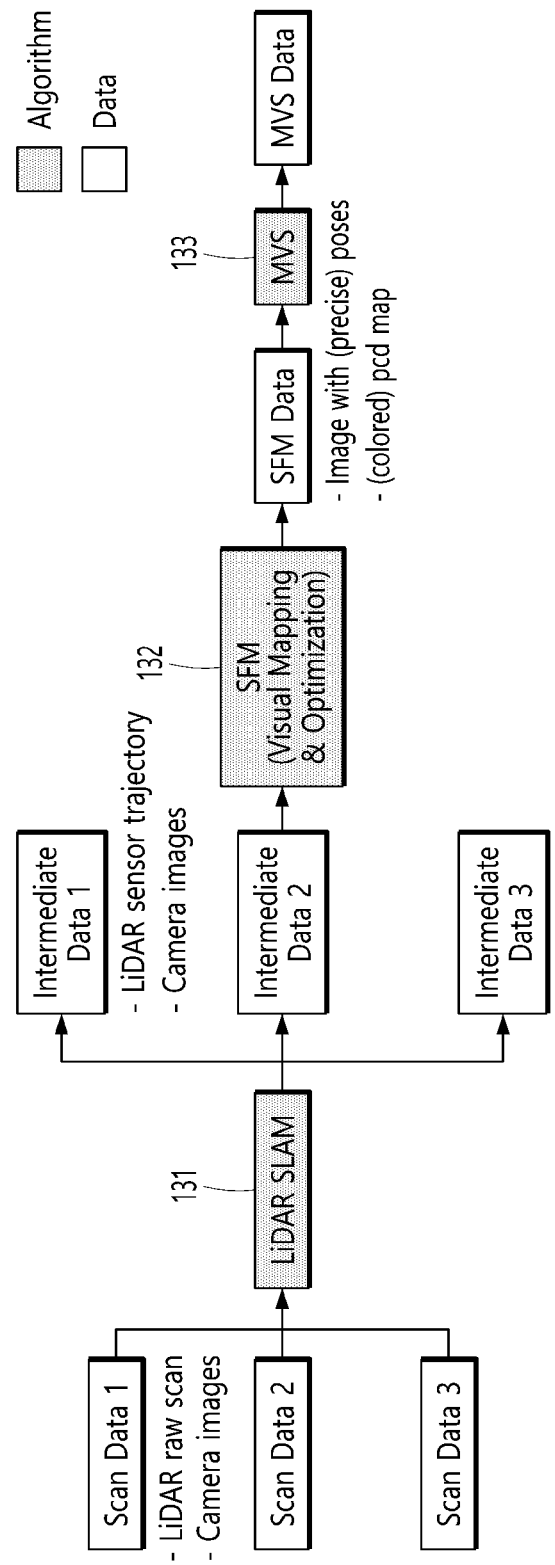
FIGS. 5 and 6 are detailed flowcharts showing an embodiment of the flowchart of FIG. 4.
Figure 6:
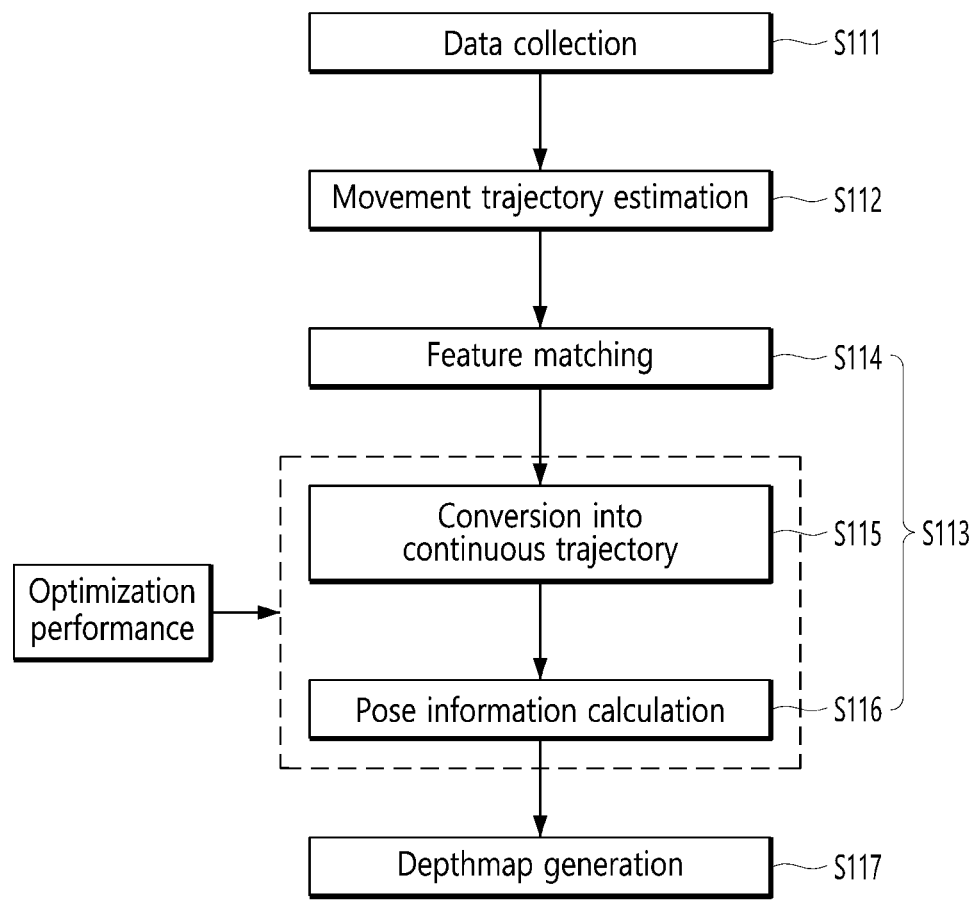
Figure 7A:
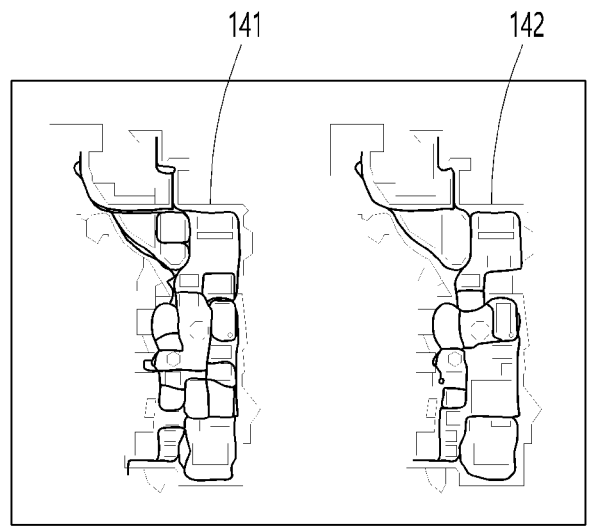
FIGS. 7A-7C are conceptual views showing an example of a data matching method by lidar SLAM.
Figure 7B:
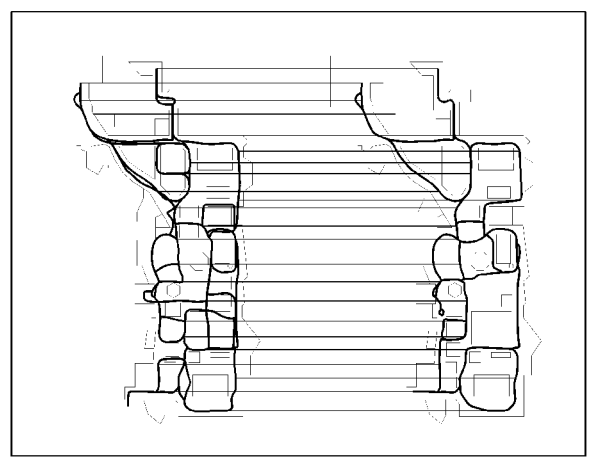
Figure 7C:
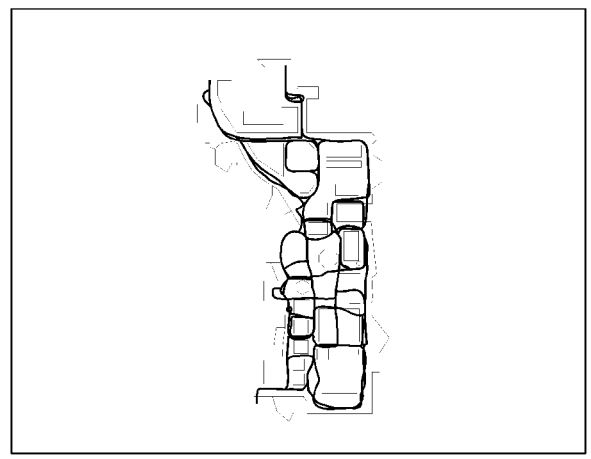
Figure 8:
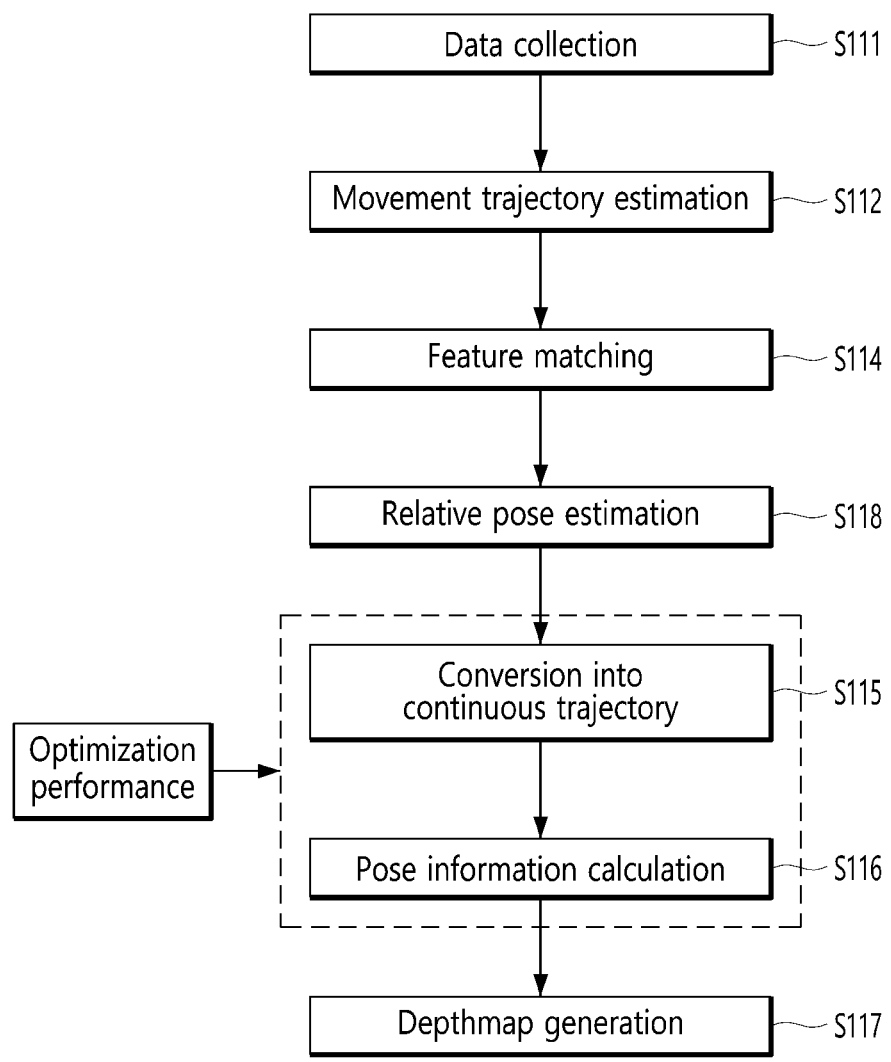
FIG. 8 is a flowchart showing an example of a data matching method by SFM.
Figure 9A:
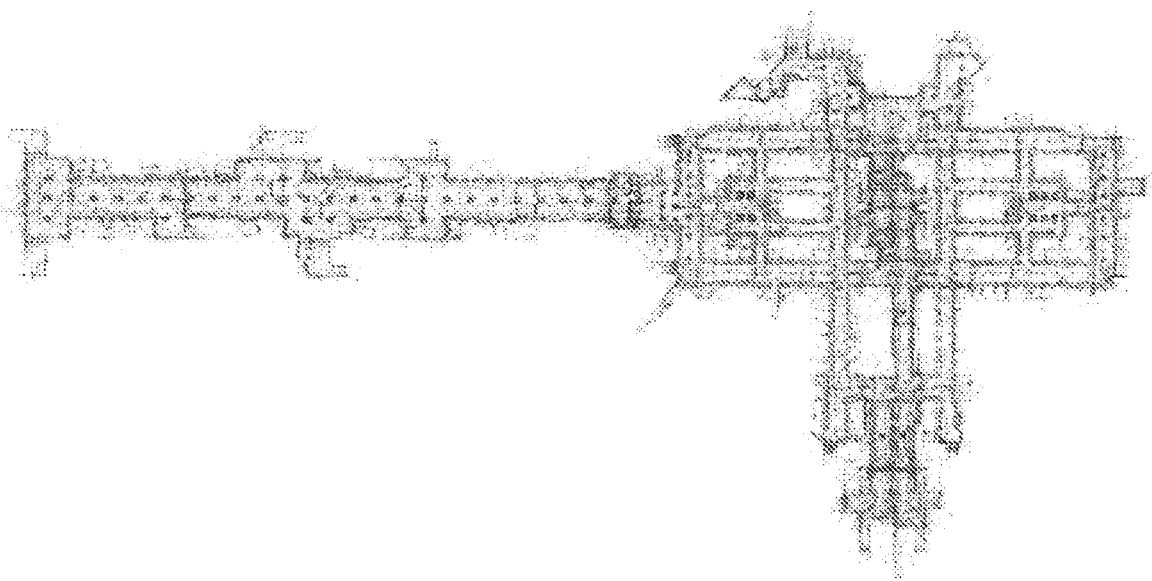
FIGS. 9A, 9B, and 10 are pictures showing substantial establishment results of a 3D map generated by the 3D map generating method according to the present invention.
Figure 9B:
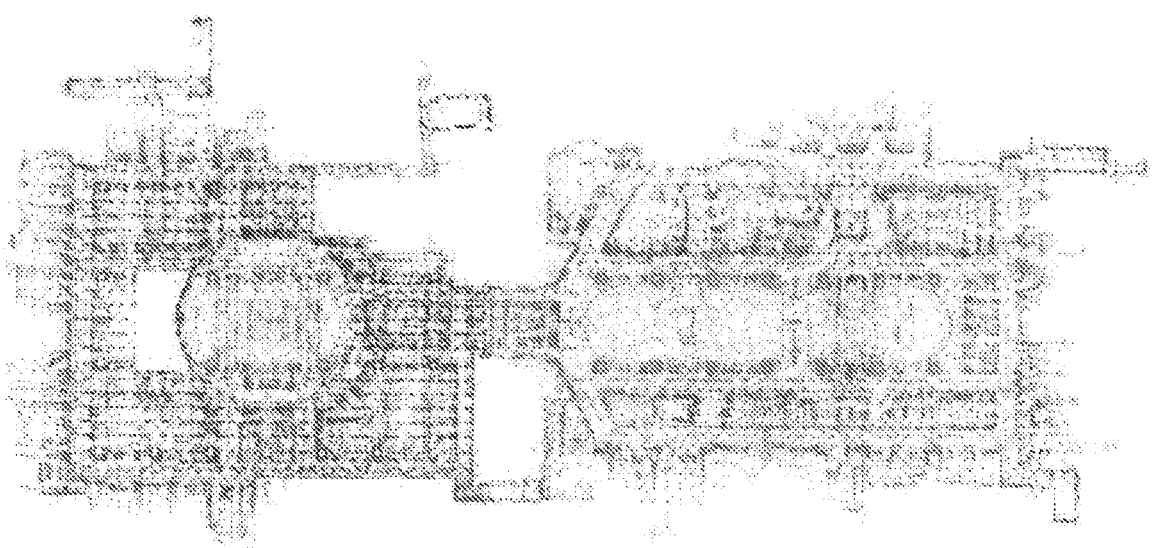
Figure 10:
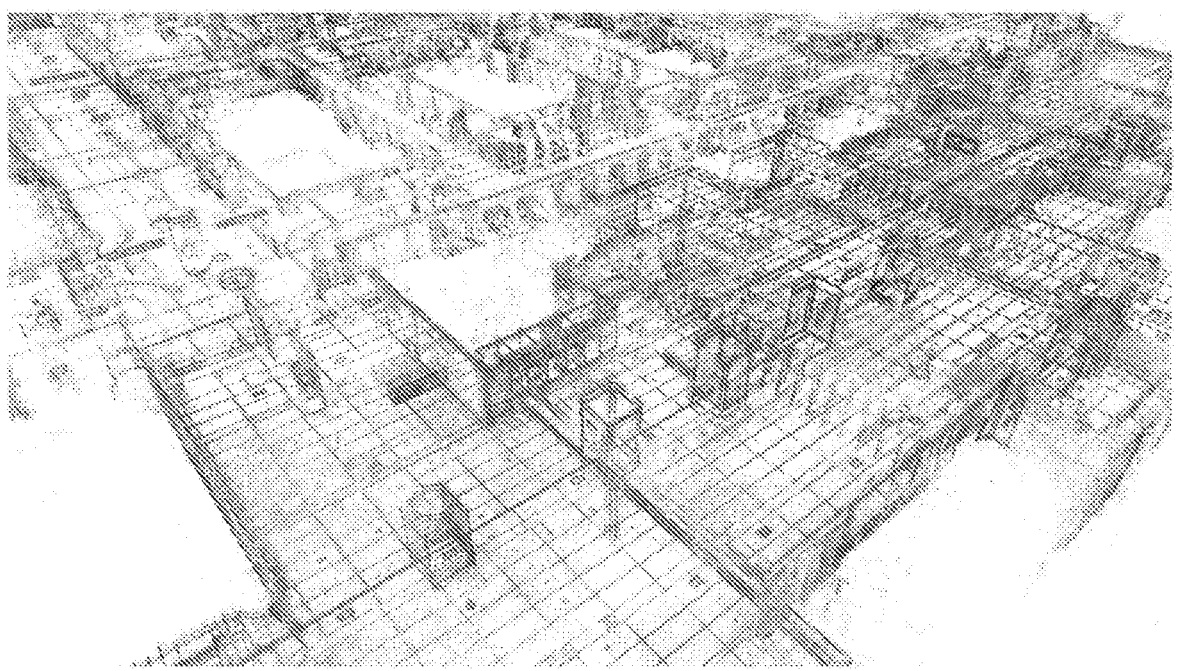

FIGS. 5 and 6 are detailed flowcharts showing an embodiment of the flowchart of FIG. 4. FIGS. 7A-7C are conceptual views showing examples of a data matching method by lidar SLAM. FIG. 8 is a flowchart showing an example of a data matching method by SFM. And FIGS. 9A, 9B, and 10 are pictures showing substantial establishment results of a 3D map generated by the 3D map generating method according to the present invention.

Referring to FIGS. 5 and 6, the lidar SLAM 131 may calculate intermediate data by using scan data.

The scan data is collected through the aforementioned data collecting step (S111), and the intermediate data may be calculated through the aforementioned movement trajectory estimating step (S112).

The scan data may be data obtained consecutively through a single scan trajectory. Here, the scan data may be provided with raw data of the lidar scan (LiDAR raw scan), and image data of the camera sensor (camera images). The lidar SLAM 131 restores a trajectory of the scan data by processing the raw data. In this case, the intermediate data may be provided with the restored lidar sensor trajectory together with the image data.

The lidar SLAM may obtain platform pose information through point cloud generation and pose graph integration.

Undistorted Point Cloud Generation

In point cloud generation, point clouds collected from a plurality of lidar sensors (e.g., two or more) may be integrated with each other in order to increase the amount of point cloud data used in a single node. Here, the point clouds expressed as different lidar coordinate systems are converted into platform coordinate systems and are correlated to each other.

As the moving speed of a platform is increased, point clouds may be distorted during such movement. To compensate for such distortion, a wheel odometry technique is applied. Through this, an initial trajectory may be estimated and lidar data distortion due to a movement may be compensated. In this case, a point position in a point cloud of a platform coordinate system may be calculated by the following formula (1).

$$R_p = R_{odom}(R_{RL}{}^L p + t_{RL}) + t_{odom} \qquad (1)$$

where Lp is the position of a point in the point cloud given in the LiDAR coordinate system,

[$R_{odom}$, $t_{odom}$] is the relative platform pose between base time of the point cloud and the point acquisition time and calculated from the wheel odometry,

[$R_{RL}$, $t_{RL}$] is the relative pose from the platform to a LiDAR sensor.

Pose-Graph SLAM

A graph edge may be set as an estimated relative pose, by using undistorted sequential point clouds. However, it is difficult to compensate for an accumulated pose error only by information on sequential nodes. Accordingly, an additional edge may be calculated among nodes spatially adjacent to each other despite a temporal distance therebetween, and such additional edge may be added to a pose-graph.

In this case, the estimated movement trajectory may be calculated as a plurality of data in a single area. For matching of the plurality of data, the 3D map generating method of the present invention may include a step of performing matching for a plurality of data.

In the step of performing matching, for matching of the plurality of data, a coordinate system conversion may be estimated among the movement trajectories, or a relative pose among the movement trajectories may be estimated. The coordinate system conversion estimation among the movement trajectories may be performed by the lidar SLAM 131, and the relative pose estimation among the movement trajectories may be performed by the SFM 132. Hereinafter, the coordinate system conversion estimation among the movement trajectories will be first explained, and the relative pose estimation will be later explained in a description about the SFM 132.

Matching Among Trajectories

By the abovementioned procedures, an estimated platform pose is expressed as an independent coordinate system with respect to each sequence. For instance, referring to FIG. 7(A), each of a dataset 141 of a first sequence and a dataset 142 of a second sequence is expressed as an independent coordinate system. In this case, as shown in FIG. 7(B), matching among key frames spatially adjacent to each other may be performed by using a registration technique. More specifically, nodes spatially adjacent to each other, despite a temporal distance therebetween, may be searched again such that a relative pose is calculated at another sequence by using an Iterative Closest Point (ICP) algorithm. An existing graph and a calculated relative pose may form a new graph, and a platform pose expressed as a single coordinate system through a graph optimization may be obtained.

In this case, as the lidar sensor, two lidar sensors may be used as aforementioned. For calibration between two lidar sensors, a relative pose may be estimated by using an Iterative Closest Point (ICP) algorithm and geometric characteristics. Also, for calibration between a platform base and a camera, online calibration through SFM may be used.

In order to integrate different coordinate systems into a single coordinate system, matching among datasets is performed. As a result, as shown in FIG. 7(c), intermediate data is calculated to which trajectory coordinate systems are matched.

As aforementioned, output data of the lidar SLAM (Simultaneous Localization and Mapping) is intermediate data, and may be provided with the image data and the movement trajectory. Thereafter, the output data is used as input data of the SFM 132 such that the lidar SLAM and the SFM form a pipeline.

The SFM 132 performs visual mapping and optimization, and outputs SFM data by receiving the intermediate data.

The generated 3D structure data is output data of the SFM, and may be provided with images having the calculated pose information and point cloud data. For instance, the SFM data may be provided with images having pose information, and a Point Cloud Data (PCD) map.

Referring to FIGS. 5 and 6 again, a step of generating the 3D structure data (S113) may include matching feature points (S114), converting the movement trajectory into a continuous trajectory (S115) and calculating pose information (S116).

In the step of matching feature points (S114), feature points are extracted from the image data, and the feature points are matched among images. For instance, feature points are extracted from each image, matching among the feature points is performed with respect to image pairs having a similar position and angle therebetween through guided feature matching.

Next, the movement trajectory is converted into a continuous trajectory, and the feature points and the pose information of the image data are optimized based on the continuous trajectory, thereby generating a 3D feature map for the specific space.

Hereinafter, feature matching and map optimization will be explained in more detail.

Local Feature Matching

For instance, Reliable and Repeatable Detectors and Descriptors (R2D2) feature points may be extracted from each image. Then, feature matching is performed by using image pairs having a short distance therebetween. In order to select image pairs having a short distance therebetween, a distance between two images and a viewing angle difference therebetween may be set as threshold values.

In this case, the matched feature points may generate 3D points by a triangulation technique.

Next, the step of converting the movement trajectory into a continuous trajectory (S115) may be performed.

In this case, the movement trajectory may be modeled into a continuous-time trajectory such that pose information of the image data is matched with the continuous trajectory. Also, in the step of calculating pose information (S116), pose information of the image data may be calculated based on the continuous trajectory.

The step of converting into a continuous trajectory and the step of calculating pose information may be performed through map optimization. The map optimization step may be an optimization step for matching pose information of images with a corresponding continuous trajectory by expressing or modeling a lidar trajectory into a continuous-time trajectory. In this case, the SFM 132 performs sophisticated optimization because it utilizes a prior movement trajectory expressed into a continuous form, unlike the conventional visual mapping (the conventional SFM). That is, after expressing a pose obtained from the previous lidar SLAM as a spline which is a continuous trajectory, optimization of a visual map is performed by using the spline as a restriction condition.

Map Optimization

Firstly, for explanation of a timestamp difference among sensors, each platform trajectory may be expressed as a continuous cubic spline in SE(3). More specifically, map optimization is performed by defining a pose error by expressing the movement trajectory as a continuous cubic spline.

The pose error $e^{spline}$ may be expressed as the following formula (2) by using a platform trajectory spline, $T_{WR}(t)$ and camera external poses, $C_i$, $T_{RC_i}$.

$$e_i^{spline} = T_{WC_i} \Theta (T_{WR}(t_i) T_{RC_i}) \quad (2)$$

Here, $\Theta$ denotes generalized minus defined in SE(3) manifold, $T_{WC_i}$ is the image pose and $t_i$ the corresponding timestamp.

An asynchronous prior pose outputted from the lidar SLAM 131 through a continuous expression of a platform trajectory may be used in the SFM 132. The pose error proposed through the spline may be optimized into a feature point reprojection error as shown in the following formula (3).

$$e_{ij}^{proj} = \tilde{z}_{ij} - \pi_{C_j}(T_{C_i}{}^W p_j) \quad (3)$$

Pose information of images and feature points may be reconstructed by a corrected bundle adjusting method.

Here, an SFM model may be generated by repeating a bundle adjustment technique and a triangulation technique. Such an SFM pipeline allows even a less-visible image or an image of a crowd to be correctly registered by integrating data outputted from the lidar SLAM.

Also, a camera calibration parameter may be automatically estimated while a 3D model of each dataset is reconstructed through the SFM pipeline.

Meanwhile, in the 3D map generating method of the present invention, it is also possible to apply a Multi-View Stereo (MVS) technique in order to generate a dense map. For example, as shown in FIGS. 5 and 6, the 3D map generating method of the present invention may include a step (S117) of generating a depthmap by applying an MVS 133.

In the step of generating a depthmap (S117), a depthmap may be generated by estimating depth information of an image by using the generated 3D structure data.

The MVS 133 may be an MVS algorithm which generates a dense visual map from SFM data calculated from the SFM 132. Through the process of generating a depthmap by using the MVS 133, MVS Data may be provided with a dense point cloud map which may have colors.

FIGS. 9A and 9B are pictures showing feature maps sparsely-reconstructed from substantially established SFM data, and FIG. 10 is a feature map densely-reconstructed from MVS data. FIG. 9(A) shows a substantial example of a 3D map for the first basement level of Gangnam station, and FIG. 9(B) shows a substantial example of a 3D map for the fourth floor of Hyundai Department Store. FIG. 10 shows a 3D map having high density and more vivid color as a result of the MVS 133.

According to the aforementioned 3D map generating method, a precise 3D map is generated through a new pipeline. This enables visual localization using query images in a large-scale indoor space, e.g., a department store or a subway station.

As aforementioned, in the present invention, data matching can also be performed in the SFM 132 by a relative pose estimation method. For this, a step of estimating a relative pose (S118) may be performed after the feature point matching step (S114) as shown in FIG. 8.

Once a trajectory of scan data (or intermediate data) is processed, coordinate systems may be differently implemented among data, even if the lidar SLAM is precise. For data matching for a single area, a coordinate system conversion among trajectories should be estimated. In this case, the coordinate system conversion may be expressed as a question to obtain a 6-DOF relative pose (3-DOF position+ 3-DOF orientation) among data.

Here, an arrangement between the lidar sensor and the camera sensor (e.g., a relative pose) can be solved together on the platform during an optimization process. Also, intermediate data matching can be performed by solving a coordinate system conversion among lidar sensor trajectories included in intermediate data during optimization.

More specifically, an initial value of a coordinate system conversion may be calculated by matching a point cloud data map for each data calculated by the lidar SLAM, by using an iterative closest point (ICP) algorithm. Here, since the SFM performs matching among images included in intermediate data, a relative pose may be estimated.

Once an initial value is given, optimization of a coordinate system conversion can be performed. When the SFM 132 optimizes image pose information and map points, if a relative pose between trajectories is set as an additional variable, optimization can be performed simultaneously. Here, if the relative pose between trajectories is different from a substantial value, a prior trajectory is wrong. This influences on optimization costs. Thus, an optimization framework calculates a Jacobian matrix of the optimization costs with respect to the relative pose, thereby calculating a precise relative pose.

Through the aforementioned visual mapping utilizing the lidar sensor trajectory, precise mapping for a large-scale indoor space can be performed by using an SFM-based algorithm suitable for an outdoor environment.

Especially, as the trajectory of the lidar sensor (or collecting device, platform, mapping robot) is expressed as a continuous-time trajectory, pose information of images obtained from the camera sensor may be matched with corresponding continuous trajectories more sophisticatedly.

Further, a 3D map established by the aforementioned method may be utilized by a visual localization service on a user's mobile device. For instance, a user may execute an application related to a visual localization service on his or her smartphone in order to check his or her position while moving on foot in a specific space, and may capture a surrounding street. The application estimates a 3D position and a pose of the mobile device by comparing feature points of a captured picture with feature points of a 3D map.

By using the estimated 3D position and pose, a precise position of the mobile device may be estimated. In this case, various services may be executed on the smartphone based on the position.

In the method and system of generating a 3D map according to the present invention, through a pipeline from lidar simultaneous localization and mapping (SLAM) to structure-from-motion (SFM), more precise indoor mapping for a large-scale space may be performed based on data collected for a predetermined period.

Since a precise 3D map is generated through a new pipeline, visual localization using query images can be performed in a large-scale indoor space(e.g., a department store or a subway station).

Further, in the present invention, since visual mapping utilizing the lidar sensor trajectory is performed, precise mapping for a large-scale indoor space may be performed by using an SFM-based algorithm suitable for an outdoor environment.

Especially, as the trajectory of the lidar sensor (or collecting device, platform, mapping robot) is expressed as a continuous-time trajectory, pose information of images obtained from the camera sensor may be matched with corresponding continuous trajectories in a more sophisticated manner.

The foregoing embodiments are merely exemplary and are not to be construed as limiting the present invention. The scope of the present invention should be determined by reasonable interpretations of the appended claims, and all changes and modifications that fall within the metes and bounds of the claims, or equivalents of such metes and bounds, are therefore intended to be embraced by the appended claims.

What is claimed is:

1. A three-dimensional (3D) map generating method, comprising:
    collecting spatial data and image data on a specific space by using a lidar sensor and a camera sensor that are each provided in association with a collecting device;
    estimating a movement trajectory of the lidar sensor by using the spatial data; and
    generating 3D structure data on the specific space based on structure-from-motion (SFM), by using the image data and the movement trajectory as input data; and
    wherein the estimated movement trajectory is calculated from a plurality of data of a single area within the specific space, wherein the plurality of data is obtained by the lidar sensor over a period of multiple days; and further wherein the method further comprises performing matching with respect to the plurality of data.

2. The method of claim 1, wherein in the collecting, the spatial data and the image data are collected through lidar simultaneous localization and mapping (SLAM) using the lidar sensor.

3. The method of claim 2, wherein output data of the lidar SLAM is provided with the image data and the movement trajectory, and wherein the output data is used as the input data such that the lidar SLAM and the SFM form a pipeline.

4. The method of claim 1, wherein the generating of the 3D structure data includes:

extracting feature points from the image data, and matching the feature points among images;

converting the movement trajectory into a continuous trajectory; and calculating pose information of the image data based on the continuous trajectory.

5. The method of claim 4, wherein the movement trajectory is modeled into a continuous-time trajectory such that the pose information of the image data is matched with the continuous trajectory.

6. The method of claim 4, wherein the generated 3D structure data is output data of the SFM, and is provided with images having their pose information calculated and point cloud data.

7. The method of claim 1, wherein in the generating of the 3D structure data, map optimization is performed by defining a pose error by expressing the movement trajectory as a continuous cubic spline.

8. The method of claim 1, further comprising generating a depth map by estimating depth information of an image by using the generated 3D structure data.

9. The method of claim 1, wherein for matching with respect to the plurality of data, a coordinate system conversion is estimated among the movement trajectories, or a relative pose among the movement trajectories is estimated.

10. A three-dimensional (3D) map generating method, comprising:

collecting spatial data and image data on a specific space by using a lidar sensor and a camera sensor, and estimating a movement trajectory of the lidar sensor;

extracting feature points from the image data, and matching the feature points among images; and converting the movement trajectory into a continuous trajectory, optimizing the feature points and pose information of the image data based on the continuous trajectory, thereby generating a 3D feature map for the specific space.

11. The method of claim 10, wherein in the generating of the 3D feature map, map optimization is performed by defining a pose error by expressing the movement trajectory as a continuous spline.

12. The method of claim 10, wherein the image data and the movement trajectory are output as output data of lidar simultaneous localization and mapping (SLAM), and wherein the 3D feature map is generated based on structure-from-motion (SFM) by using the image data and the movement trajectory as input data.

13. The method of claim 10, wherein the estimated movement trajectory is calculated from a plurality of data of a single area within the specific space, wherein the plurality of data is obtained by the lidar sensor over a period of multiple days; and further wherein the method further comprises performing matching with respect to the plurality of data.

14. A three-dimensional (3D) map generating system, comprising:

a collecting device having a lidar sensor and a camera sensor; and a mapping device configured to generate a 3D feature map for a specific space by using the collecting device, wherein the collecting device collects each of spatial data and image data on the specific space by using the lidar sensor and the camera sensor, wherein the mapping device estimates a movement trajectory of the lidar sensor by using the spatial data, and generates 3D structure data on the specific space based on structure-from-motion (SFM), by using the image data and the movement trajectory as input data, wherein the estimated movement trajectory is calculated from a plurality of data of a single area within the specific space, wherein the plurality of data is obtained by the lidar sensor over a period of multiple days; and further wherein the method further comprises performing matching with respect to the plurality of data.

* * * * *